(12) United States Patent
Laste et al.

(10) Patent No.: US 7,548,187 B1
(45) Date of Patent: Jun. 16, 2009

(54) ADAPTIVE CLUTTER FILTERING TO IMPROVE HIGH SUB-CLUTTER VISIBILITY RADAR DETECTION PERFORMANCE

(75) Inventors: Gregory S. Laste, Hudson, NH (US); Garret E. Murdza, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 104 days.

(21) Appl. No.: 11/594,419

(22) Filed: Nov. 8, 2006

Related U.S. Application Data

(60) Provisional application No. 60/734,902, filed on Nov. 9, 2005.

(51) Int. Cl.
*G01S 13/00* (2006.01)
*G01S 13/50* (2006.01)

(52) U.S. Cl. ............... 342/159; 342/104; 342/109; 342/195

(58) Field of Classification Search ......... 342/159–164, 342/89–103, 195–196, 104–117
See application file for complete search history.

(56) References Cited

U.S. PATENT DOCUMENTS

| | | | | | |
|---|---|---|---|---|---|
| 3,775,768 | A | * | 11/1973 | Lisle et al. | 342/101 |
| 4,234,880 | A | * | 11/1980 | Klemm | 342/159 |
| 4,559,537 | A | * | 12/1985 | Pearson et al. | 342/99 |
| 5,539,412 | A | * | 7/1996 | Mendelson | 342/192 |
| 5,784,026 | A | * | 7/1998 | Smith et al. | 342/160 |

OTHER PUBLICATIONS

MATLAB Signal Processing Toolbox 6 User's Guide Mar. 2006 revisions for version 6.5 (Release 2006a) p. 7-646-7-647.*
Tsui, James Bao-Yen Microwave Receivers Wiley Encyclopedia of Electrical and Electronics Engineering Article Online Posting Date: Dec. 27, 1999.*

* cited by examiner

*Primary Examiner*—Thomas H Tarcza
*Assistant Examiner*—Cassi Galt
(74) *Attorney, Agent, or Firm*—Robert K. Tendler; Daniel J. Long

(57) ABSTRACT

In an aircraft-mounted Doppler radar clutter rejection system, a flexible, sharp band pass filter uses Taylor weighting, an FFT and a module for selecting which of the Doppler cells are to be activated, thus to control the band pass characteristic and set the clutter line to the speed of the aircraft.

18 Claims, 5 Drawing Sheets

ADAPTIVE CLUTTER FILTERING TO IMPROVE HIGH SUB-CLUTTER VISIBILITY RADAR DETECTION PERFORMANCE

RELATED APPLICATIONS

This Application claims rights under 35 USC § 119(e) from U.S. Application Ser. No. 60/734,902 filed Nov. 9, 2005, the contents of which are incorporated herein by reference.

STATEMENT OF GOVERNMENT INTEREST

This invention was made with United States Government support under Contract No. N00019-87-C-0138 with the Navy. The United States Government has certain rights in this invention.

FIELD OF THE INVENTION

This invention relates to electronic countermeasures and more particularly to a method and apparatus for filtering out Doppler ground clutter returns.

BACKGROUND OF THE INVENTION

For a number of years, active Doppler radars have been used to detect incoming missiles, which are fired at a platform, and to cue appropriate countermeasures. One of the major problems to eliminate false alarms on ground clutter is to be able to ignore the returns from objects on the ground that are reflecting back the radar pulses to the platform. The reflected signals from the ground clutter exhibit a Doppler shift reflecting the velocity or speed of the aircraft that is overflying the region. In the past, this was accomplished by elimination or removal of signals having a Doppler shift equal to or lower than the maximum speed of the aircraft. This meant utilizing analog crystal filters having a fixed band pass.

If, for instance, the platform was flying at a maximum of 600 knots, then it was the purpose of these filters to filter out anything that had a Doppler frequency shift indicative of movement equal to or less than the 600-knot ground speed of the aircraft. Normally, since incoming missiles would approach the platform at speeds much higher than the maximum speed of the aircraft relative to the ground, filtering out Doppler shifts indicating speeds equal to or less than the maximum speed of the aircraft was effective to eliminate the ground clutter from detection or contention in determination of the presence of a threat.

The problem with such fixed analog filters is that tailoring the response to reject ground clutter utilizing the maximum speed of the aircraft denied the flexibility required when the aircraft reduced its speed from its maximum value to some lower value.

For instance, if the filters were designed to reject Doppler shifts equal to or lower than 400 knots, when the aircraft was flying at 100 knots, any Doppler returns indicating speeds between 100 knots and 400 knots would be rejected. Thus an incoming missile with a closing velocity between 100 and 400 knots would be ignored.

In short, there was a necessity for providing an inexpensive system to be able to adaptively change what is referred to herein as the "clutter line," which refers to the Doppler shift associated with the actual ground speed of the aircraft rather than its maximum speed. This type of flexibility would result in the detection of incoming missiles or threats having a Doppler shift associated with a speed or velocity less than the maximum speed or velocity of the aircraft.

More particularly, Doppler radar detection systems are located on moving platforms, which are utilized to transmit pulses into a scanned area and to receive back reflected energy. The energy includes energy that may be reflected from a high-speed missile but more often includes back clutter, which is energy that bounces off the ground and is reflected back with a Doppler shift reflecting the relative motion of the aircraft to the ground.

The problem is to be able to detect incoming missiles approaching the platform and to be able to deploy countermeasures. It is noted that the incoming missile has a Doppler shift associated with its approaching velocity. If that velocity is above the velocity associated with the clutter, then one can easily filter out the clutter. To do this, analog filter crystals have been employed. However, these filters are very expensive, heavy and have fixed filter characteristics.

Note the analog crystal filters define a clutter region to be rejected such that the remaining energy, if it is above the Doppler frequency of the clutter, would then be detectable.

Active radar systems in the past also utilized a number of different range gates so as to be able to limit for consideration only specific ranges from the platform. Each of these range gates would then be assigned different clutter filters, with the range gate basically defining where the platform thinks that the incoming missile is.

Thus in the past there were two types of filtration to eliminate false alarms. One was range gating such that the system would eliminate consideration of returns from objects at ranges other than a predetermined range; and secondly, to process the output of the range gate to eliminate consideration of any Doppler shifts that were less than or equal to the maximum ground speed of the aircraft. In short, these filters would be high pass filters that would pass all the Doppler frequencies above the Doppler shifts associated with the clutter. Thus all energy below the clutter line would be rejected, leaving all the frequencies above the clutter line to detect fast-moving threats approaching the platform.

It is noted that ground clutter, rather than having a single Doppler shift associated with it, generally includes large structures that provide returns that indicate not a single Doppler shift but a range of Doppler shifts. This is due to the particular geometry between the platform and the ground clutter object, as well as the different angles at which the reflected radar pulse is received at the platform.

It is noted that the closing speed of a missile is in a range on the order of hundreds to thousands of meters per second, in which the highest Doppler shift is around 15 kilohertz, given, for instance, a one-gigahertz L-band radar.

It is noted that the Doppler shift could be significantly lower, namely, for instance, possibly between 3 kilohertz to 15 kilohertz depending on the particular type of missile.

In these early systems the analog crystal filters would simply eliminate Doppler shifts below some particular Doppler shift, in general that associated with the maximum speed of the aircraft involved.

However, such active radar protection could be deployed on such diverse aircraft as unmanned aerial vehicles, fixed-wing subsonic aircraft, rotary-wing aircraft or supersonic aircraft.

Choosing or designing the analog crystal filters for the maximum speed of multiple aircraft presented a problem in that they had to be redesigned for each aircraft into which they were to be installed.

Moreover, in addition to the cost of the crystal filters, they are relatively large, in some instance being 3 by 5 inches and an inch thick. With a half a dozen of such filters, they occupy a significant amount of rack space. This is a significant drawback when active radars are deployed on unmanned aerial vehicles. Moreover, the filters themselves may be several thousands of dollars each, and one is essentially stuck with a fixed velocity, assuming that the filters are cut for the maximum velocity of the aircraft. Additionally, these filters were of a sub-octave type, which limited the range/Doppler combination. A sub-octave filter is basically a filter where the ratio of the lowest frequency it passes to the highest frequency it passes is less than two. Thus they are relatively narrow-banded and were not easily adapted to aircraft of differing maximum speeds.

Additionally, inherent to the high pass band to transition band ratio of the crystal filters, is long ring or settling time, leading to an elevated false alarm rate. In order to deal with the long ring time, designers typically had to raise the detection thresholds, which would mean giving up some systems sensitivity. Note that when one increases the detection threshold, one basically decreases the range at which one can detect an incoming missile.

For purposes of the subject invention, clutter frequency is defined as the Doppler shift associated with fixed objects on the ground relative to the moving platform.

Also by way of definition, the clutter spectrum is defined in a Doppler sense as the maximum plus or minus Doppler shift frequency associated returns from ground objects. The reason that there is a clutter spectrum is that one has scatterers behind the platform and scatterers in front of the platform. Thus, one obtains a clutter spectrum that has both plus and minus Doppler shift. In one worst-case scenario involving a supersonic platform, one might have a clutter spectrum as wide as 4 kilohertz. The clutter spectrum is important because it defines the range of the Doppler frequency shifts one wants to reject.

By setting whatever filters are used to reject Doppler shifts below the speed of the aircraft, one can set the filters to at least reject as much as 4 kilohertz of Doppler shift clutter.

SUMMARY OF INVENTION

Rather than utilizing fixed analog crystal filters with their inflexibility, weight and cost, in the subject invention one uses a Fourier transform windowing technique to create a sharp band pass filter with moveable edges. In one embodiment of the subject invention a Taylor weighting system windows the output of a range gate samples prior to performing an FFT to create a series of side-by-side Doppler cells or filters that constitute the band pass filter. The weights allow one to dial in the rejection that one would like. In this particular application, the use of the Taylor weights enables one to dial in a Fourier transform filter response that has a minus-110-dB side lobe rejection. This means that one can provide a band pass filter with exceedingly high rejection characteristics.

Thus, rather than having to design for the maximum speed of the aircraft, one can sense the speed of the aircraft and automatically select which of the Doppler cells from the FFT to enable for target detection processing. Only the Doppler cells associated with Doppler shifts greater than Doppler shift associated with the forward speed of the air vehicle are enabled for target detection. This means that the system can be instantly reconfigured or tailored to the actual speed of the aircraft as opposed to the maximum speed of the aircraft. If the air vehicle speeds up, the Doppler, frequency of clutter line increases, the Doppler cells that the clutter energy has moved into must now be deactivated for target detection processing. If the air vehicle slows down, the Doppler frequency of the clutter line decrease, the Doppler cells the clutter energy has vacated can now be activated for target processing.

What this allows one to do is to select the Doppler cells or filters that are just above the frequency from the clutter line so that if the aircraft speeds up, one deactivates the Doppler cells corresponding to the Doppler frequency shifts to the left of the Doppler frequency associated with the increased speed. This moves up the left edge of the band pass filter to the right to match the actual aircraft speed. On the other hand, if the aircraft slows down, then one activates additional Doppler cells to move the left-hand edge of the band pass filter to the left to match the reduced speed of the aircraft.

Thus, with the utilization of analog crystal filters, one always had to set the clutter line to be at the highest anticipated forward speed of the aircraft. This meant that if one was going slower than maximum speed, one might have a missile approaching the aircraft below the maximum speed, which was rejected as clutter.

With the subject invention one is able to select the number of usable Doppler cells or filters and thus define the left-hand band pass filter edge.

Assuming a 128-point FFT, then one might select 80 of the side-by-side Doppler cells or filters as being usable, with the left-most filter of the 80 filters defining the left-hand edge of the pass band. Note, the other Doppler filters define the bandwidth of the band pass filter.

However, if the aircraft slows down, the clutter line may move, for instance 500 hertz. This means that one would activate additional Doppler filters to the left of the left-most filter, for instance for a total of 85 activated filters.

This essentially adds capacity to detect a closing missile regardless of the maximum speed at which the platform is capable of flying. Thus, the filtering system is optimized to detect incoming objects that come up to the slowing platform.

In summary, in an aircraft-mounted Doppler radar clutter rejection system, a flexible, sharp band pass filter uses Taylor weighting, an FFT and a module for selecting which of the Doppler cells are to be activated, thus to control the band pass characteristic and set the left band pass edge that defines the clutter line to the speed of the aircraft.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
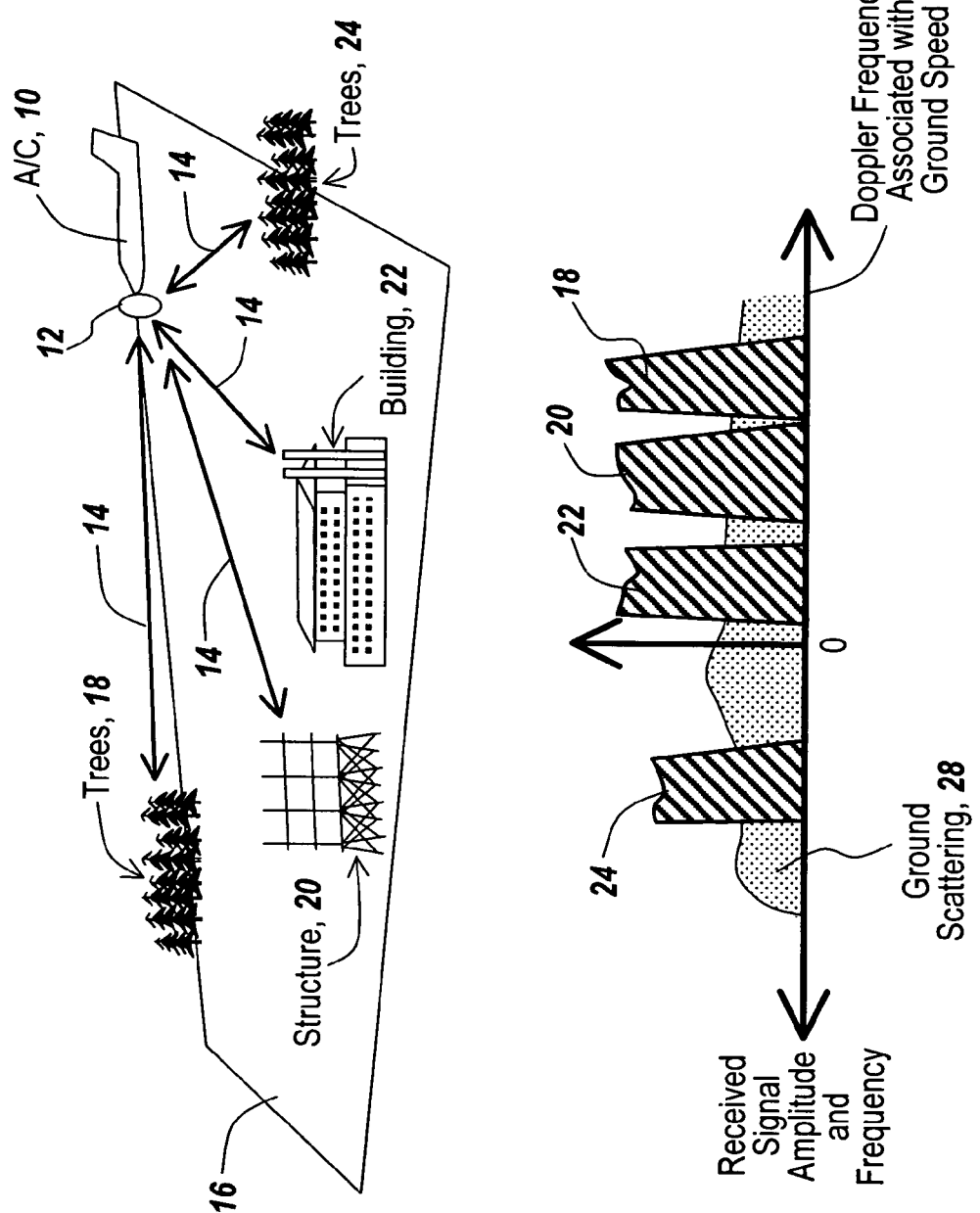
FIG. 1 is a diagrammatic illustration of ground clutter associated with returns from an active radar, illustrating relatively broad Doppler frequency shifts due to the differing geometries.

Referring now to FIG. 1, an aircraft 10 serves as a platform for an active radar having an antenna 12 that projects pulses 14 towards the ground 16.

Various stationary structures on the ground, such as for instance trees 18, structures 20, buildings 22 or trees 24 cause energy from radar antenna 12 to be scattered back towards the aircraft.

Since the aircraft has a ground speed associated with its travel, if one graphs Doppler frequency versus amplitude, one can see that trees 18 have a Doppler shift that is to the right of the zero Doppler shift frequency and is not a single line but rather is spread out, indicating the different geometries associated with different elements of the tree relative to the aircraft. Likewise, structure 20 has a broadened profile for its returns, as does building 22.

It is noted that aircraft 10 is traveling towards each of these ground features such that the Doppler shift is positive with respect to the aircraft platform. However, as can be seen by trees 24, they are behind aircraft 10 and therefore their Doppler shift is in a negative direction.

Also shown at 28 is the ground scattering, which results when the ground is irradiated with the radar pulses. It will be seen that the amplitude of the returns from structures on the ground exceeds that of the ground clutter relating to the ground itself.

The purpose of the subject invention is to be able to reject or eliminate the effects of detected Doppler shifts due to stationary structures on the ground or the ground itself.

Figure 2:
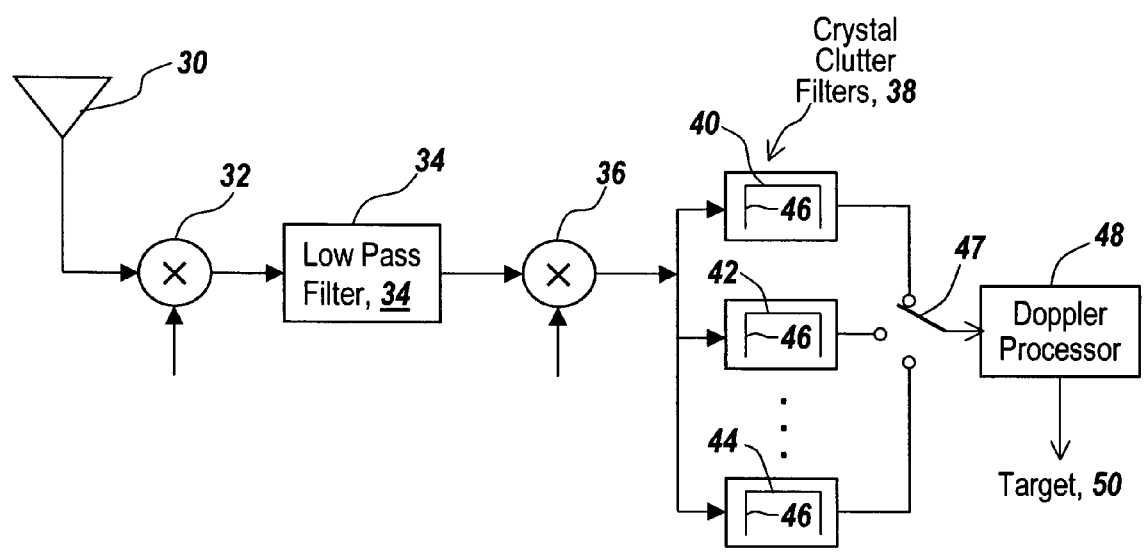
FIG. 2 is a schematic diagram of a prior art active radar in which radar returns are processed by an array of clutter filters that are sampled prior to their outputs being processed for determination of the existence of a target or threat.

In order to accomplish this, in the past and referring now to FIG. 2, an active radar antenna 30 is used to receive returns from the scene of FIG. 1. These returns are heterodyned at 32 and then low-pass filtered at 34, at which point they are heterodyned again at 36. This effectively heterodynes the incoming signal to base band, where the signal is applied to a bank of analog crystal clutter filters 38.

These are relatively sharp fixed band pass filters that define band passes 40, 42 and 44, with a clutter edge 46 being set to the Doppler shift that is associated with the maximum ground speed of the aircraft.

The output of these filters is sampled by a switch 47 to apply the output of the filters to a traditional Doppler processor 48 that detects the presence of a incoming missile or target as illustrated at 50.

As mentioned hereinbefore, the problem is that the crystal clutter filters, aside from being expensive and heavy as well as occupying a relatively large amount of rack space, are fixed as to the clutter line. The clutter line is factory pre-set to correspond to the Doppler shift associated with the maximum ground speed of the particular aircraft involved.

As will be seen, if the aircraft is not flying at its maximum ground speed but rather at some lower speed, then the Doppler shift frequency clutter cutoff will be set too high and the signals of interest, namely the returns from the missile, may be cut off by the pre-set band pass filter characteristic.

Thus, for instance, if clutter line 46 determined by a fixed filter is set to, for instance 400 knots and the aircraft slows to, for instance, 200 knots, then for approaching missiles having a closing velocity of between 200 and 400 knots, the Dopplers associated will be rejected by the filters.

It is for this reason that adaptability and flexibility needs to be designed in active radar systems so as not to arbitrarily leave voids in the Doppler frequency shifts that can be utilized to detect an incoming missile.

Figure 3:
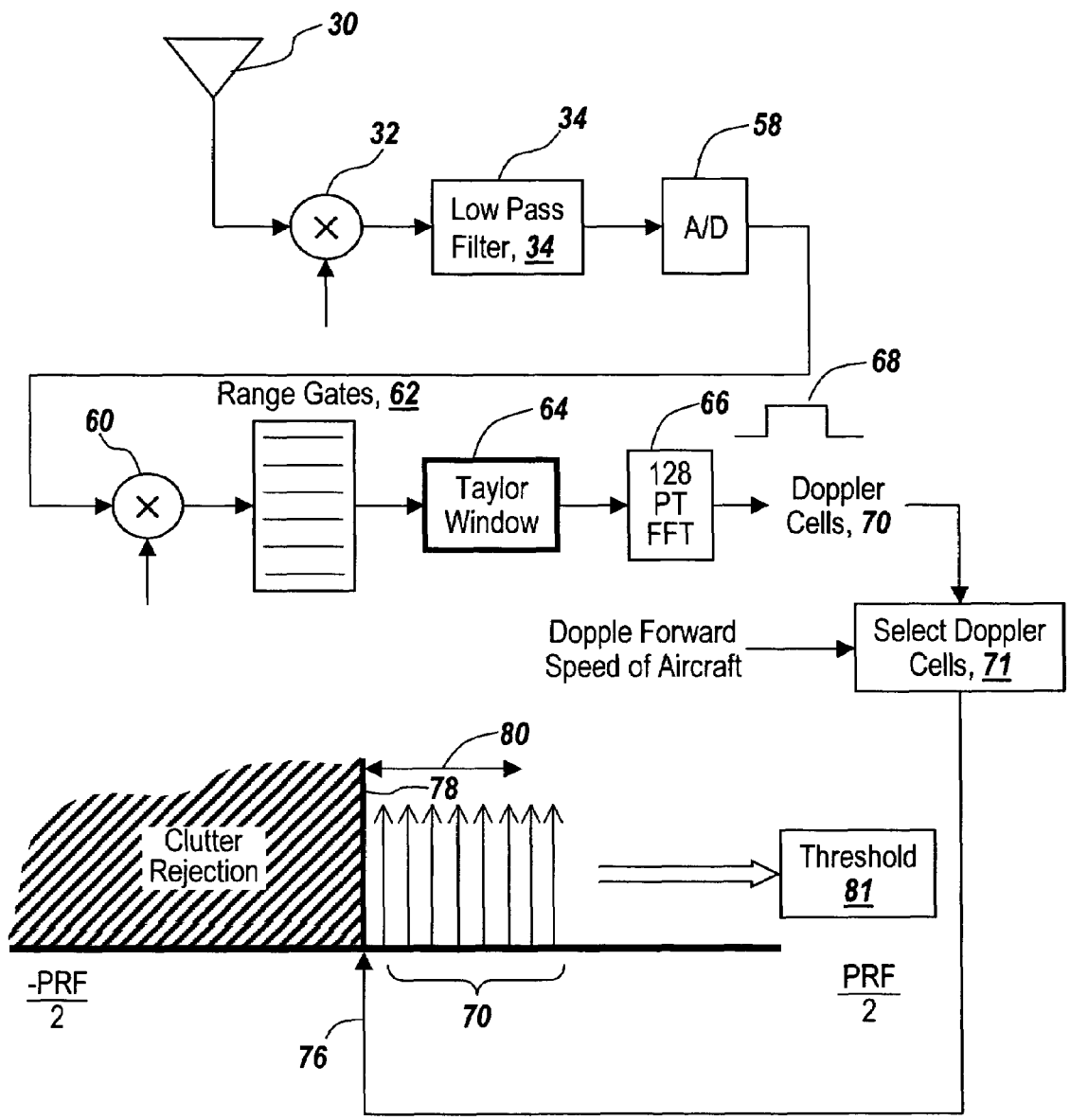
FIG. 3 is a diagrammatic illustration of the utilization of a Taylor window to process or weight the outputs of the various range gates in the radar, which weighted outputs are coupled to a fast Fourier transform that generates side-by-side Doppler cells or filters that together constitute a sharp-edged band pass filter, with selected Doppler cells or filters defining a movable band pass filter lower edge for rejecting Doppler shifts due to ground clutter.

Referring now to FIG. 3, in the subject system, incoming reflected pulses are detected at antenna 30, which are heterodyned at 32 and then passed through a low pass filter 34, whereupon they are analog-to-digital converted at 58 and then further heterodyned at 60 prior to being applied to a series of range gates 62. The base band data in each of the range gates is sequentially applied to a Taylor window 64, which for each range bin weights the data with Taylor window weights W for each range gate. This weighted data is then coupled to a fast Fourier transform algorithm 66, which in one embodiment is a 128-point fast Fourier transform.

It is the function of the Taylor window to provide weights to a particular range bin or gate. If each range bin or gate is designed to store 128 pulses making up the range gate measurement, then one multiplies each of the values of the pulses by the 128 Taylor window coefficients so as to apply a weighting factor to each of the pulses. These pulses are then coupled to a 128-point FFT that is provided with the band pass characteristic 68 by selecting which of the side-by-side Doppler cells or filters that are output from the FFT 66 are active to define the band pass.

It will be appreciated that the FFT produces a large number of Doppler cells that span a frequency range of between +PRF/2 and −PRF/2, where PRF is the pulse repetition frequency. Thus, the FFT does a complete spectral analysis of the incoming signal and provides as its output the levels of the incoming signal at its various frequency bins.

However, as can be seen in FIG. 3, the Doppler forward speed of the aircraft is derived from the sensed aircraft speed over ground. The forward ground speed is converted to a Doppler shift. Doppler cell selector 71 selects a number of Doppler cells to define the band pass characteristic of the band pass filter and especially the left-hand edge, which is a Doppler shift matching the aircraft ground speed Doppler shift. This Doppler shift is illustrated at arrow 76 and it is this Doppler shift frequency that defines clutter line 78.

Below the clutter line 78, the system de-selects any Doppler cells or filters so that any Doppler shifts that come in below the Doppler shift indicated at 76 will be rejected.

In this manner, any incoming missile that has a speed relative to the aircraft that is above the Doppler shift associated with the ground speed will be detected by the selected Doppler cells 70. What this means is that a target will be detected in the region by double-ended arrow 80.

Figure 4:
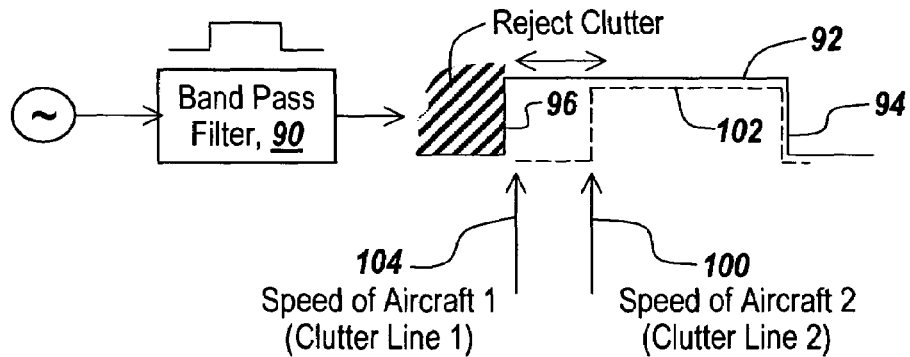
FIG. 4 is a diagrammatic illustration of the operation of the band pass filter associated with the Taylor weightings and the fast Fourier Doppler cell generation, indicating the ability to move the lower edge of the band pass filter to that associated with the ground speed of the aircraft, thus to tailor the band pass characteristic to the ground speed of the aircraft.

Referring now to FIG. 4, the effect of using the Taylor window weighting and FFT Doppler cell processing is to provide a band pass filter 90 having a band pass characteristic 92. This band pass characteristic 92 has a right edge 94 and a left edge 96.

It is the purpose of the subject invention to be able to accurately select left edge 96 and make it coincident with the sensed ground speed of the aircraft such that if the maximum speed of the aircraft is illustrated at 100, then the band pass filter characteristic is as illustrated by dotted line 102.

However, if the aircraft slows to a speed 104, then left edge 96 of the band pass filter edge is lowered in frequency.

Rather than utilizing fixed high-Q, narrow band crystal filters, the subject system provides very sharp skirts for the band pass characteristic while at the same time being able to move the left-hand side of the characteristic to correspond in frequency to the Doppler frequency shift associated with the actual speed of the aircraft.

Figure 5A:
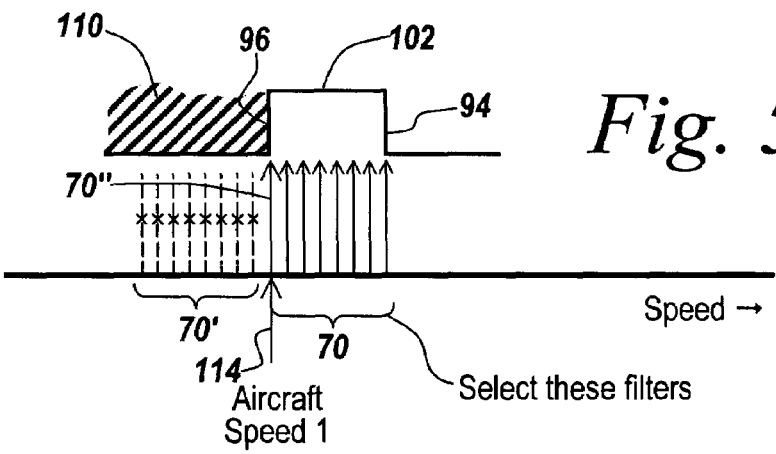
FIG. 5A is a diagrammatic illustration of the generation of the band pass characteristic of FIG. 4 for an aircraft speed for corresponding to the maximum speed of the aircraft, showing de-selected Doppler cells being those below the Doppler shift associated with the ground speed of the aircraft.
Figure 5B:
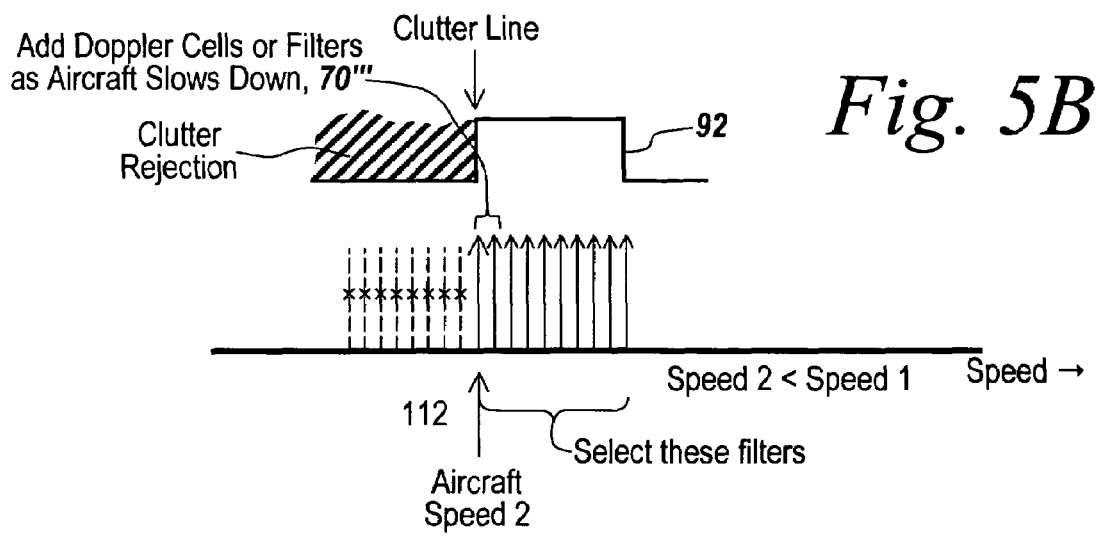
FIG. 5B is a diagrammatic illustration of the movement of the left-hand side of the band pass characteristic of FIG. 5A to accommodate a sensed aircraft speed less than the maximum speed of the aircraft through the adding of additional Doppler cells or filters as the aircraft slows down, such that the left-most of the added Doppler cells or filters is coincident with the Doppler shift associated with the ground speed of the aircraft.

How this is done is shown in FIGS. 5A and 5B. Here it can be seen that the band pass characteristic 102 is achieved by selecting Doppler cells or filters 70 to fill up the area between right edge 94 and left edge 96 so that signals within this frequency range will be passed by the band pass filter.

By de-selecting Doppler cells 70', one creates a Doppler shift rejection zone 110, where ground clutter is rejected. Note that the aircraft speed determines the left-most of the Doppler cells to be selected such that Doppler cell 70" is that Doppler cell which is associated with the Doppler shift corresponding to the ground speed of the aircraft.

Referring to FIG. 5B, if the aircraft slows down one seeks to alter the band pass characteristic so that it corresponds to band pass characteristic 92 of FIG. 4. Thus arrow 112 is moved to the left of the aircraft speed illustrated by arrow 114 in FIG. 5A. Since aircraft Speed 2 corresponding to arrow 112 is slower than aircraft Speed 1 corresponding to arrow 114, one needs to add Doppler cells or filters 70'''.

By adding the Doppler cells or filters, one can achieve band pass coverage from the maximum ground speed as illustrated in FIG. 5A to the actual lower ground speed as illustrated in FIG. 5B, whereby target or missile returns having Doppler velocities in this region will be detected as opposed to being rejected, as would be the case with fixed analog crystal filters.

What this filtering system does is to be able to ignore any Doppler shifts that are less than the sensed forward ground speed of the aircraft. Thus, in the subject system the Doppler cells are selected to be only corresponding to those Doppler shifts above the instantaneous ground speed of the aircraft.

As can be seen from FIG. 3, the output of the FFT includes Doppler cells, with the energy in the Doppler cells being applied to a threshold circuit 81. Any outputs exceeding the threshold indicate an incoming missile or threat.

Note that by adjusting the weighting, one determines the depth of the band pass edge rejection. Note also that the Taylor weighting results in monotonic, uniform side lobes. If one pushes the side lobes down by setting the weights to a maximum rejection, for instance, of 110 dB, the main lobe grows. Thus, the weighting determines the frequency response for the Doppler bin.

Figure 6:
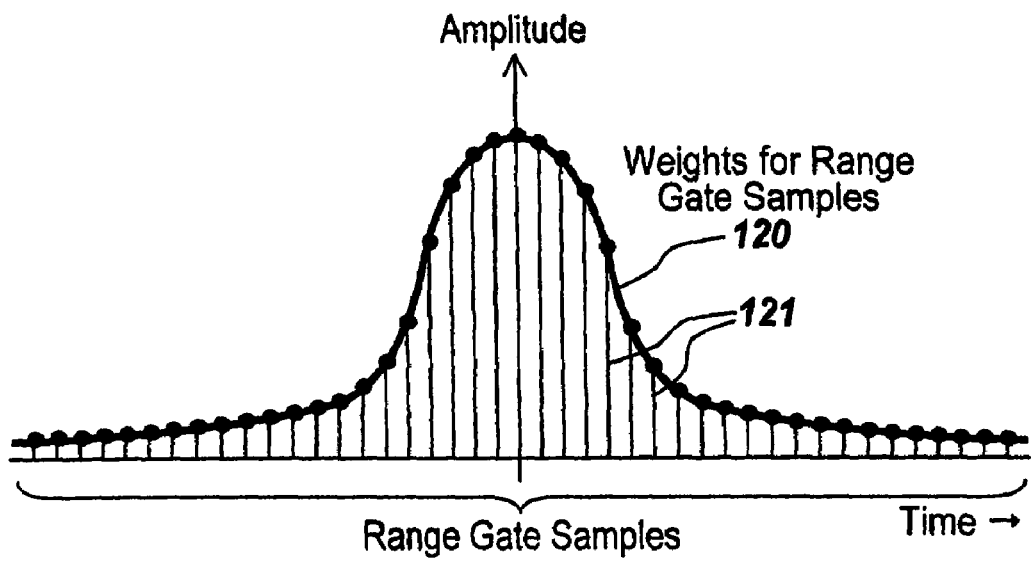
FIG. 6 is a graph showing a filter characteristic of a band pass filter in which amplitude is graphed against time; and, FIG. 7 is a graph of an amplitude-versus-frequency band pass characteristic for weighting the output of a range gate of FIG. 3 so as to provide a −110 dB rejection at the sides of the band pass filter.
Figure 7:
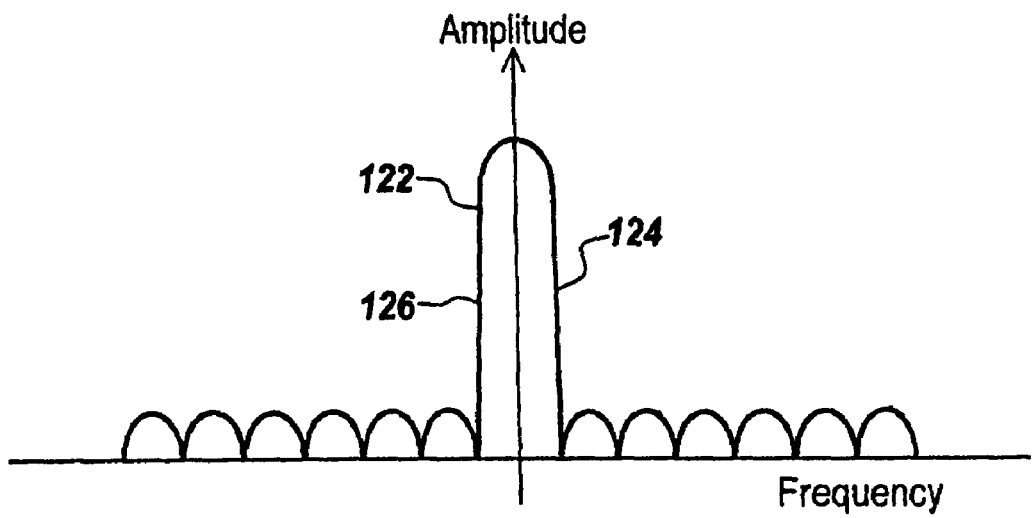

Referring now to FIG. 6, a curve that specifies the Taylor weights is shown at 120 to be the weights for range gate samples 121. In one embodiment, there are 128 range gate samples. Each one of the range gate samples represents a single returned pulse at a given range. Thus the 128 pulses are time domain representations of the radar return. Each of these samples is multiplied by a Taylor weighting coefficient that has the general shape of curve 120 shown in FIG. 6. In actuality, continuous curve 120 is composed of 128 discrete weights, with the pulses at the discrete time points multiplied by the appropriate weight. These weighted range gate samples are then input to the 128-point FFT, which results in the frequency versus amplitude characteristic for each Doppler cell or filter shown at 122 in FIG. 7. As will be seen, this is a characteristic of a very narrow filter having steep skirts 124 and 126. Note the Taylor filter characteristic does not have any ripples and the pass band is basically a single hump.

The result of weighting the time domain data with a Taylor window is a frequency-versus-time response for each of the individual Doppler cells or filters. One can characterize the output of the FFT as being a band pass filter whose filter characteristic is that composed of the side-by-side Doppler cells that resemble comb lines associated with a filter bank of evenly spaced filters.

The result for each of the Doppler cells or filters is that each has very steep edges or skirts and uniform monotonic side lobes deeply suppressed.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In an aircraft-mounted active radar for detecting incoming threats, a method for adaptively setting the clutter line of a filter used to reject clutter to correspond to the Doppler shift associated with sensed aircraft ground speed, comprising the steps of:
   analog-to-digitally converting radar pulses received at the aircraft from a surveilled area;
   range gating the returned pulses;
   multiplying a predetermined number of pulses from a range gate with weights;
   applying the pulse weights to a fast Fourier transform to generate side-by-side Doppler cells; and,
   selecting those Doppler cells for activation having Doppler shift frequencies above a clutter line Doppler shift frequency associated with the sensed aircraft ground speed, thereby to reject clutter having Doppler shifts below the aircraft ground speed and for passing returns having Doppler shift frequencies above the aircraft ground speed, whereby the clutter rejection line is set in accordance with the sensed aircraft ground speed.

2. The method of claim 1, wherein the fast Fourier transform is a 128-point fast Fourier transform.

3. The method of claim 2, wherein the weights are applied to 128 pulses from an associated range gate.

4. The method of claim 2, wherein the weights define Doppler cells having a skirt rejection to either side of the cell of 110 dB.

5. The method of claim 1, and further including the step of thresholding the outputs of the selected Doppler cells for indicating the presence of the incoming threat.

6. A method for eliminating the use of fixed analog filters to filter out ground clutter in an active radar system mounted on a moving platform to detect the presence of incoming threats closing in on the platform in which the clutter line for the filter is determined by the maximum speed of the platform, comprising:
   converting radar returns at the moving platform from analog to digital form;
   weighting the converted returns with weights that when processed with a fast Fourier transform establish a large main lobe region and uniform monotonic side lobes below a predetermined rejection level;
   coupling the weighted returns to the fast Fourier transform for creating side-by-side Doppler cells; and, selecting for target detection only those Doppler cells having Doppler shift frequencies above the clutter line which are above the Doppler shift associated with the ground speed of the moving platform, whereby the resulting clutter filter Doppler clutter line frequency is the same as the Doppler frequency associated with the sensed speed of the platform.

7. The method of claim 6, and further including the step of range gating the returns at the platform prior to applying the weighting.

8. The method of claim 7, and further including the step of analog-to-digitally converting the returns at the platform prior to the range gating step.

9. The method of claim 6, wherein the weighting that produces the uniform monotonic side lobes is such that the side lobes are at least 110 dB down from the peak of the band pass characteristic associated with a Doppler cell.

10. The method of claim 6, wherein the selected Doppler cells include a lowest-frequency activated Doppler cell corresponding to the maximum speed of the platform.

11. The method of claim 10, and further including the step of ascertaining the ground speed of the platform and adding Doppler cells of lower frequency than that associated with the Doppler shift corresponding to the maximum speed of the platform but equal to or above the Doppler frequency skirt associated with sensed platform speed, whereby incoming threats having a closing speed less than the maximum speed of the platform will be detected if the closing speed has a Doppler shift greater than that of the sensed platform speed.

12. Apparatus for the rejection of ground clutter in an active radar system mounted aboard a moving platform that projects pulses towards the ground and that is designed to detect an incoming threat, comprising:

an antenna for receiving pulsed radar returns at said platform;

a heterodyning unit for heterodyning the pulses received at said antenna for the down-conversion thereof;

a low pass filter coupled to the output of said heterodyning unit;

an analog-to-digital converter coupled to the output of said low pass filter;

a weight generator for multiplying the analog-to-digital-converted signals with weights;

a fast Fourier transform module coupled to said weight generator for forming Doppler cells; and, a Doppler cell selector for selecting Doppler cells corresponding to clutter line Doppler shifts above the Doppler shift associated with the ground speed of said platform, whereby the output of said fast Fourier transform module is filtered by a band pass filter characteristic having a lower edge adaptively movable to correspond to the Doppler shift associated with the ground speed of said platform through said selection of Doppler cells.

13. The apparatus of claim 12, and further including a thresholding unit for thresholding Doppler cell outputs for an indication of the presence of an incoming threat.

14. The apparatus of claim 12, and further including a series of range gates interposed between said analog-to-digital converter and said weight generator.

15. The apparatus of claim 14, wherein said weight generator applies weights to the output of only one of said range gates, whereby said range gates filter out returns at non-selected ranges.

16. In an active Doppler radar system carried aboard a moving platform, a band pass filter for filtering out ground clutter having a band pass characteristic with variable edges, comprising:

a weight generator for weighting Doppler returns at said platform;

a fast Fourier transform module coupled to the output of said weight generator for generating contiguous Doppler cells; and, a Doppler cell selector module for selecting contiguous Doppler cells to form the pass band of said band pass filter, with the selection of Doppler cells defining the band pass edges of said band pass filter, one of said band pass filter edges being a clutter line defined by the Doppler associated with the speed of the moving platform.

17. The band pass filter of claim 16, wherein said weight generator produces weights such that when the weighted outputs are applied to said fast Fourier transform module, the individual Doppler cells have a major lobe surrounded by uniform monotonic side lobes.

18. The band pass filter of claim 17, wherein said uniform monotonic side lobes exist 110 dB down from the peak of said major lobe.

* * * * *